US008182910B2

(12) United States Patent
Sugita

(10) Patent No.: US 8,182,910 B2
(45) Date of Patent: May 22, 2012

(54) TIP-RESISTANT SHEET FOR STANDING ARTICLES

(75) Inventor: Kikuo Sugita, Aichi (JP)

(73) Assignee: Kikuo Sugita, Aichi (JP)

( * ) Notice: Subject to any disclaimer, the term of this patent is extended or adjusted under 35 U.S.C. 154(b) by 235 days.

(21) Appl. No.: 11/889,870

(22) Filed: Aug. 17, 2007

(65) Prior Publication Data
US 2008/0060303 A1   Mar. 13, 2008

Related U.S. Application Data

(63) Continuation of application No. PCT/JP2005/018849, filed on Oct. 13, 2005.

(30) Foreign Application Priority Data

Feb. 23, 2005  (JP) ................................. 2005-046672
Jun. 2, 2005   (JP) ................................. 2005-162631

(51) Int. Cl.
   *B32B 5/16*   (2006.01)
(52) U.S. Cl. ............................................. 428/323; 27/1
(58) Field of Classification Search .................. 428/323; 27/1; D99/17, 18
See application file for complete search history.

(56) References Cited

U.S. PATENT DOCUMENTS

| | | | | |
|---|---|---|---|---|
| 4,899,323 | A | * | 2/1990 | Fukahori et al. ............. 367/176 |
| 4,932,673 | A | * | 6/1990 | Domnikov et al. ........... 277/608 |
| 5,113,760 | A | * | 5/1992 | Sonobe et al. ............... 101/348 |

FOREIGN PATENT DOCUMENTS

| | | |
|---|---|---|
| JP | 54-11964 | 1/1979 |
| JP | 55-42881 | 3/1980 |
| JP | 57-143240 | 9/1982 |
| JP | 63-9745 | 1/1988 |
| JP | 1-135629 | 5/1989 |
| JP | 1-150037 | 6/1989 |
| JP | 1-190847 | 7/1989 |
| JP | 2-53541 | 4/1990 |
| JP | 2-276712 | 11/1990 |

(Continued)

OTHER PUBLICATIONS

Monument Definition downloaded from http://www.thefreedictionary.com/monument on Feb. 4, 2010.*

(Continued)

*Primary Examiner* — Callie Shosho
*Assistant Examiner* — Elizabeth Robinson
(74) *Attorney, Agent, or Firm* — Occhiuti Rohlicek & Tsao LLP

(57) ABSTRACT

A tip-resistant sheet capable of preventing heavy and easily toppled structures such as tombstones and gravestones, memorial tablets, Buddhist images, furniture, refrigerators, pianos, heavy articles on four wheels, and furniture with thin legs from tipping over utilizes an elastic material that is characterized in that one or more types of spherical bodies, different from the elastic material, are embedded in the elastic material. The tip-resistant sheet is characterized in that the spherical bodies, different from the elastic material and having a diameter equal to or larger than the thickness of the elastic material, are used. The tip-resistant sheet can also utilize a composite material formed by laminating an elastic material onto a metal material and the spherical bodies, different from the elastic material and having a diameter equal to or larger than the thickness of the composite material, are placed against surface of the composite material.

10 Claims, 4 Drawing Sheets

FOREIGN PATENT DOCUMENTS

| | | |
|---|---|---|
| JP | 3-88758 | 4/1991 |
| JP | 3-52446 | 5/1991 |
| JP | 4-46237 | 2/1992 |
| JP | 4-102742 | 4/1992 |
| JP | 8-226249 | 9/1996 |
| JP | 9-25990 | 1/1997 |
| JP | 10-159381 | 6/1998 |
| JP | 10-176436 | 6/1998 |
| JP | 10-278148 | 10/1998 |
| JP | 11-93460 | 4/1999 |
| JP | 11093460 A * | 4/1999 |
| JP | 11-315885 | 11/1999 |
| JP | 2003-202052 | 7/2003 |
| JP | 2004-11692 | 1/2004 |
| JP | 2004011692 A * | 1/2004 |
| JP | 2004-316420 | 11/2004 |
| JP | 3111534 | 6/2005 |
| JP | 2005-180130 | 7/2005 |

OTHER PUBLICATIONS www.kozosoft.co.jp/gijyutu/s20.html.

* cited by examiner

TIP-RESISTANT SHEET FOR STANDING ARTICLES

This application is a continuation of International Patent Application No. PCT/JP2005/018849 filed Oct. 13, 2005. This PCT application was not in English as published under PCT Article 21(2).

FIELD OF INVENTION

This invention relates to a tip-resistant sheet, more specifically, a tip-resistant sheet and tip-resistant method for preventing heavy-standing articles such as gravestones, stone monuments, funeral articles, Buddhist altar articles, furniture, refrigerators, pianos, heavy articles on four wheels, and furniture with thin legs from tipping over.

TECHNICAL BACKGROUND

When stacking pieces of furniture such as chests of drawers, a sheet having viscosity and elasticity is conventionally inserted between the chests of drawers so as to absorb vibration in order to stabilize the movement of the furniture. Patent Document 1 indicated below refers a method to use a vibration control sheet integrating zinc fiber and organic polymer. Patent Document 2 indicated below refers a method to form rubber film between an upper standing stone and a base stone of a gravestone. Patent Document 3 indicated below discloses a method to insert a flexible adhesive agent and elastic buffer material between the upper standing stone and the base stone of a gravestone. Patent Document 4 indicated below additionally suggests a method to prevent a gravestone from collapsing by engaging metal bars that run through the upper-standing stone and the base stone of a gravestone. However, it is complicated to produce and install such stones. Non-patent document 1 indicated below teaches that to realize a seismic isolation structure, it is necessary to attenuate or dampen the energy caused by an earthquake, and that laminated materials made of rubber and steel are effective. The related Patent Document 5 indicated below is also available.

Patent Document 1: Japanese utility model application No. S54-11964
Patent Document 2: Japanese utility model application No. H02-53541
Patent Document 3: Japanese patent application No. H11-93460
Patent Document 4: Japanese patent application No. 2005-180130
Non-patent Document 1: www.kozosoft.co.jp/gijyutu/s20.htm
Patent Document 5: Japanese Patent No: 2589727

However, if the aforementioned methods are adopted to stabilize heavy articles such as gravestones, furniture or refrigerators, the sheets to be placed under them or interlaid will break due to the heavy weight of the articles, and eventually the tip-resistant effect will deteriorate. Also, the method shown in Document 4 above, is still complicated.

DISCLOSURE OF THE INVENTION

Problems to be Resolved by the Invention

The purpose of this invention is to develop a tip-resistant sheet, which is characterized in that the elastic sheet has spherical bodies, different from the elastic materials, to prevent heavy structures such as gravestones, stone monuments, or the like or heavy articles such as funeral items, Buddhist images, furniture, refrigerators, heavy items on four wheels, or furniture with thin legs from tipping over, and to develop a tip-resistant method to protect such heavy articles from tipping over by embedding the spherical bodies in the outer area of a laminate of the elastic body sheet.

Means for Solving the Problems

Tip-resistant sheet and tip-resistant method described in this invention have a sheet and method incorporating the following features.

(1) A tip-resistant sheet in this invention is characterized by comprising elastic body sheet made of elastic materials and one or more types of spherical bodies made selectively from metals such as tins, lead-free solders, solders, leads, brasses, gold, silvers, gold-plated metals, or the like, linear polymer molecules such as polyethylene, polypropylene, polyester, or the like, and plastics incorporating cross-linked structure such as melamine resin, epoxy resin, or the like, and the spherical bodies being embedded in the layers of the elastic body sheet.

(2) A tip-resistant sheet of the aforementioned invention (1) is characterized in that diameters of the spherical bodies are equal to or less than the thickness of the elastic body sheet.

(3) A tip-resistant method in this invention is characterized in that one or more types of spherical bodies made selectively from metals such as tins, lead-free solders, solders, leads, stainless steels, brasses, gold, silvers, gold-plated metals, or the like, linear polymer molecules such as polyethylene, polypropylene, polyester, or the like, and plastics incorporating cross-linked structure such as melamine resin, epoxy resin, or the like, are embossed in the outer areas of the elastic body sheet made of the elastic materials.

(4) A tip-resistant method of the aforementioned invention (3) is characterized in that diameters of the spherical bodies are equal to or greater than the thickness of the elastic body sheet.

(5) A tip-resistant method of the aforementioned invention (3) or (4) is characterized in that stopper walls for the spherical bodies are provided around the spherical bodies.

(6) An elastic body sheet made of elastic materials to be used for the tip-resistant sheet of the aforementioned invention (3) or (4) is characterized in that cylindrical holes are provided so that spherical bodies or combinations of spherical bodies and stopper walls for the spherical bodies can be embedded.

(7) A tip-resistant sheet is characterized by comprising an elastic sheet made of elastic materials together with spherical bodies made of rubbers, having a higher vulcanization than elastic materials to be used in the elastic sheet, the spherical bodies being incorporated in the elastic body sheet.

(8) A tip-resistant method is characterized in that spherical bodies made of rubbers, having a higher vulcanization than the elastic materials to be used in the elastic sheet, are embedded in the outer areas of the elastic sheet made of the elastic materials.

(9) A tip-resistant sheet is characterized by comprising an elastic body sheet made of elastic materials and composite materials which is laminated with metal materials or plastics, and one or more types of spherical bodies made selectively from metals such as tins, lead-free solders, solders, leads, brasses, gold, silvers, gold-plated metals, or the like, linear polymer molecules such as polyethylene, polypropylene, polyester, or the like, plastics incorporating cross-linked structure such as melamine resin, epoxy resin, or the like, and rubbers having higher vulcanization than the elastic materials to be used for the elastic body sheet, the spherical bodies being embedded in the layers of the elastic body sheet.

(10) A tip-resistant method is characterized in that one or more types of spherical bodies made selectively from metals such as tins, lead-free solders, solders, leads, stainless steels, brasses, gold, silvers, gold-plated metals, or the like, linear polymer molecules such as polyethylene, polypropylene, polyester, or the like, plastics incorporating cross-linked structure such as melamine resin, epoxy resin, or the like, and rubbers having higher vulcanization than the elastic materials to be used for the elastic body sheet, are embedded in the outer areas of the elastic body sheet made of elastic materials and composite material which is laminated with metal materials or plastics.

(11) A tip-resistant method is characterized in that a tip-resistant sheet of the aforementioned invention 1, 2, 6, 7 or 9 is inserted between a base stone and a vertically-standing stone of the article, between an intermediate stone and a vertically-standing stone of the article, or between an intermediate stone and a base stone of the article.

(12) A tip-resistant method for a standing article is characterized in that a tip-resistant method of the aforementioned invention 3, 4, 5, 8 or 10 is applied between a base stone and a vertically-standing stone of the article, between an intermediate stone and a vertically-standing stone of the article, or between an intermediate stone and a base stone of the article.

If only elastic materials or viscous plastics, which have been conventionally used in the tip-resistant method, are applied to heavy articles, then such elastic materials or viscous plastics may become distorted by heavy weight and not remain durable. Besides the elastic materials, metals, ceramics, plastics, hardened rubbers or the like are also used in this invention.

In this invention, the materials used for the spherical bodies include metals, ceramics, plastics, wood, paper, hardened rubbers or the like. Those materials are more rigid than elastic bodies, and they are not easily distorted even if pressure is applied. If pressure is vertically applied to a tip-resistant sheet made of an elastic material and of spherical bodies made from a combination of metals, ceramics, plastics, wood, paper, or the like, then the elastic body sheet is soon distorted, and the originally thick tip-resistant sheet becomes thin. If pressure is continually applied to the surface of the sheet, then metals or plastics (wood or paper) become distorted together with the elastic body sheet so that a standing article is supported and efficiently prevented from tipping over. If ceramics bodies, which are not easily distorted, are embedded in the elastic body sheet, such ceramics are insufficient for the inventive spherical bodies. Therefore, regarding the diameters of the spherical bodies which are to be embedded in the sheet, the diameter of ceramic spherical bodies, which are the most resistant to distortion, should be the smallest so that the function of the inventive spherical bodies is not hindered.

The forms of the spherical bodies to be used in this invention include balls, oval spheres, cubes, circular cylinders, or the like, in which each corner is rounded off. Such spherical-shaped bodies, having even thicknesses in all directions, can be uniformly embedded in the entire tip-resistant sheet.

In this invention, the thickness of the tip-resistant sheet is to be preferably from 1.0 mm to 50 mm. If it is more than 50 mm thick, the tip-resistant effect of the sheet will have reached its limit, and the appearance of the gravestone or stone monument will look unattractive.

The radius of the spherical bodies to be used in this invention is to be preferably from 0.5 mm to 10 mm. If it is smaller than 0.5 mm, the effect is less sufficient. On the other hand, if it is larger than 10 mm, the tip-resistant sheet would be too thick, which would mar the appearance of the gravestone or stone monument.

The preferable metals to be used for the spherical bodies in this invention include tins, solders, leads, brasses, golds, silvers, gold-plated metals, or the like, which are greatly malleable and pliable.

The preferable plastics to be used for the spherical bodies in this invention include linear polymer molecules such as polyethylene, polypropylene, polyester, or the like, and other plastics having a cross-linked structure such as melamine resin, phenol resin, epoxy resin or the like. These plastics are easily obtained.

The preferable wood to be used in this invention includes sawdust, wood chips or the like. Also, the kinds of paper, which can be used in this invention include amulets, good-luck charms or the like. The kinds of rubber which can be vulcanized higher than the elastic materials are to be used for the spherical bodies in this invention. They are called hard rubbers. Normal rubbers are called soft rubbers and are usually 100 pts. wt. of unsaturated rubber containing from 0.5 to 5.0 pts. wt. of sulfur. On the other hand, a hard rubber of 100 pts. wt. containing from 30 to 50 pts. wt. of sulfur, which is very hard, can be used if it is heated for a long time.

The elastic materials which can be used in this invention include artificial rubbers and natural rubbers such as polyurethane rubber, butyl rubber, acrylic rubber, silicon rubber, and styrene-butadiene rubber. Also, to give viscosity to a surface of a gravestone or a stone monument, it is possible to use a tackifier such as terpene resin, phenolic resin, and rosin resin, or other agents such as polyalkylene glycol or the like. Generally, linear polymer molecules such as ethylene-vinyl acetate copolymer which is known in the prior art, is not appropriate, since recovery from the distortion of the tip-resistant sheet is insufficient. It is also possible to use silicon, carbon, petroleum resin, polyalkylene glycol, or the like in the elastic materials so that the protection against vibration can be enhanced.

The elastic materials to be used in this invention can also be laminated with metal materials or plastics to make composite materials. The plastic materials include polyester film, polyolefin film or the like, and their thickness should be approximately from 0.1 to 2.0 mm. Metal materials or plastics can be laminated to become elastic materials, thus improving its plastic pliability when an earthquake occurs.

In this invention, the content ratio of the spherical bodies to the tip-resistant sheet preferably should be from 1.0 to 40.0 wt. %. It is difficult to embed the spherical bodies in the tip-resistant sheet if they exceed 40.0 wt. % of the sheet. If the ratio is less than 1.0 wt. %, the tip-resistant effect will not be insufficient.

The inventive tip-resistant sheet can be placed onto the entire surface or the partial surface of a base stone of a gravestone, with a vertically-standing stone to be placed onto the tip-resistant sheet. Also, wood, papers, or the like can be placed between the tip-resistant sheets. The diameters of the spherical bodies to be embedded in the tip-resistant sheet can be lesser or greater than the thickness of the elastic materials to be used. If the diameters of the spherical bodies to be embedded are greater than the thicknesses of the elastic materials to be used, then it is preferable to use mainly metals, plastics, wood, papers, or the like, each comparatively having sufficient plastic pliability for the spherical bodies. These same materials can be also used for the tip-resistant method by incorporating the conglomerate of an elastic body sheet and spherical bodies.

This invention, a tip-resistant sheet, is a conglomerate made of an elastic body sheet of elastic materials and spherical bodies composed of comparatively pliable materials such as metals, plastics, wood, papers or the like to be placed on the surface of the base stone of a gravestone, with the vertically-standing stone placed on the tip-resistant sheet. When the vibrating energy of an earthquake pushes against the tip-resistant sheet, the elastic materials will become deformed. At the same time, the spherical bodies, composed of comparatively plastic pliable materials such as metals, plastics, wood, papers, or the like, will absorb most of the energy of the earthquake, thus keeping the vertically-standing stone of a gravestone from toppling. If this invention were composed of only elastic bodies, it would be insufficient to absorb vibrating energy, compared to using the combination of an elastic bodies and spherical bodies made of metals, plastics, wood, papers, or the like, which have comparatively great plastic deformation.

To place the tip-resistant sheet more effectively between the base stone and a vertically-standing stone of a gravestone, an adhesive agent or pressure-sensitive adhesive may be applied on one or both surfaces of the tip-resistant sheet. The adhesive agent, or pressure-sensitive adhesive mentioned here includes crude caoutchouc, an acrylic adhesive agent, a polyvinyl acetate adhesive agent, an epoxide-based adhesive, or the like.

DESCRIPTION OF THE PREFERRED EMBODIMENTS

To make the elastic bodies, mix 3.0 parts of tin balls, each of a diameter from 2.5 to 4.0 mm on average as spherical bodies, and 2.0 parts of alumina ceramic balls, each of a diameter of 1.5 mm on average as materials of the elastic bodies, in 30.0 parts of polyester urethane elastomer. Heat this mixture and spread it like a sheet. The alumina ceramics as materials and tin balls as spherical bodies are then dispersed in the sheet.

Cut the sheet, and, as shown above in FIGS. 1 and 2, set four pieces 4 of the sheet in four places on the base stone 2 of the gravestone. Then, place the vertically standing stone 3 on the base stone 2, thus forming a standing article 1. According to the weight-load of the base stone 2 of the gravestone, the different elastic bodies in the sheet will either spread or contract in thickness, allowing the tin balls to greatly receive the weight load. Thus, the gravestone will not easily topple by the vibration of an earthquake.

FIG. 3 is a cross-sectional sketch showing a tip-resistant sheet composed of a polyurethane elastic body 5, tin balls 6 and alumina ceramic balls 7 before being compressed by a heavy load.

FIG. 4 is a cross-sectional sketch showing a tip-resistant sheet composed of a polyurethane elastic body 5, tin balls 6 and alumina ceramic balls, when being compressed by a heavy load.

FIG. 5 is a cross-sectional sketch showing the state of the invention immediately after a polyurethane elastic body 5, as an elastic body sheet to be used for the tip-resistant method, together with tin balls 6, having a diameter greater than the thickness of the elastic body sheet and cylindrical-shaped stopper walls 10, are embedded in the cylindrical-shaped air holes of the sheet, and said sheet is placed between a base stone 2 and a vertically-standing stone 3 of a gravestone.

FIG. 6 is a top view as well as FIG. 5, showing that polyurethane elastic bodies 5, tin balls 6, and cylindrical-shaped stopper walls 10 are placed on a base stone 2 of a gravestone.

FIG. 7 is a cross-sectional sketch showing the state of the invention after being left for a certain period of time after a polyurethane elastic body 5, as an elastic body sheet to be used for the tip-resistant method, together with tin balls 6, having a diameter greater than the thickness of the elastic body sheet, and cylindrical-shaped stopper walls 10, are embedded in the cylindrical-shaped air holes of the sheet, and said sheet is placed between a base stone 2 and a vertically-standing stone 3 of a gravestone.

FIGS. 5 to 7 show the placement of spherical bodies in the outer area of the elastic body sheet, with cylindrical-shaped air holes provided in the elastic body sheet, and tin balls 6 and cylindrical-shaped stopper walls 10 embedded in the air holes of the sheet on a base stone 2 of a gravestone. However, regarding another method, plural elastic body sheets of appropriate sizes can be placed on the surface of a base stone 2, and then spherical bodies set adjacently to the stopper walls 10, can be placed in an empty areas of the sheet. In this case, it is unnecessary to cut or make the elastic body sheet into an even size, as a combination of any different-sized sheets can be placed. Also, it is possible to provide grooves in the sheet to place spherical bodies and stopper walls thereon.

FIG. 8 is a cross-sectional sketch showing how an elastic body sheet is to be used for the tip-resistant method in FIG. 5, an elastic body sheet composed of a composite material which is laminated with a polyurethane elastic body sheet 5 and a metallic plate 9.

FIG. 9 is a cross-sectional sketch showing the state of the metallic plate 9 that is placed on a sheet comprising polyurethane elastic bodies 5, tin balls 6 and alumina ceramic balls 7, and another sheet comprising the same materials placed thereon, with the weight load then being applied on such a structured sheet.

As described above, instead of 2.0 parts of alumina ceramics having a diameter of 1.5 mm on average, polypropylene balls having a diameter from 2.5 to 4.0 mm on average is used. Thus, it is recognized that a gravestone will not easily tip over by the vibrations of an earthquake.

To make elastic bodies, mix 2.0 parts of alumina balls having a diameter of 1.5 mm on average and epoxy resin balls, having a diameter of 2.3 mm on average, in 30 parts of silicon resin. Make it into a sheet. Then, cross-link the silicon resin so that a sheet incorporating alumina and epoxy resin in the silicon resin is obtained. Thus, the tip-resistant function is improved.

As described above, this inventive tip-resistant sheet has the following desirable practical effects.

(a) The inventive tip-resistant sheet can be effectively set on the base stone of any type of gravestone, as well as on any type of joint, or clearance, upon which any type of vertically-standing stone can be set, so that the gravestone is protected from the ravages of nature such as an earthquake, or the like.

(b) The inventive tip-resistant sheet can be used on any type of gravestone so that refurbishing of a gravestone can be easily done at a reduced cost.

(c) The inventive tip-resistant sheet can be used to protect heavy articles such as memorial tablets, Buddhist images, furniture, refrigerators, pianos, other heavy articles on four wheels, and furniture with thin legs from tipping over.

(d) The materials to be used in making the inventive tip-resistant sheet are safe. They are not harmful to the environment.

Figures 1, 2:
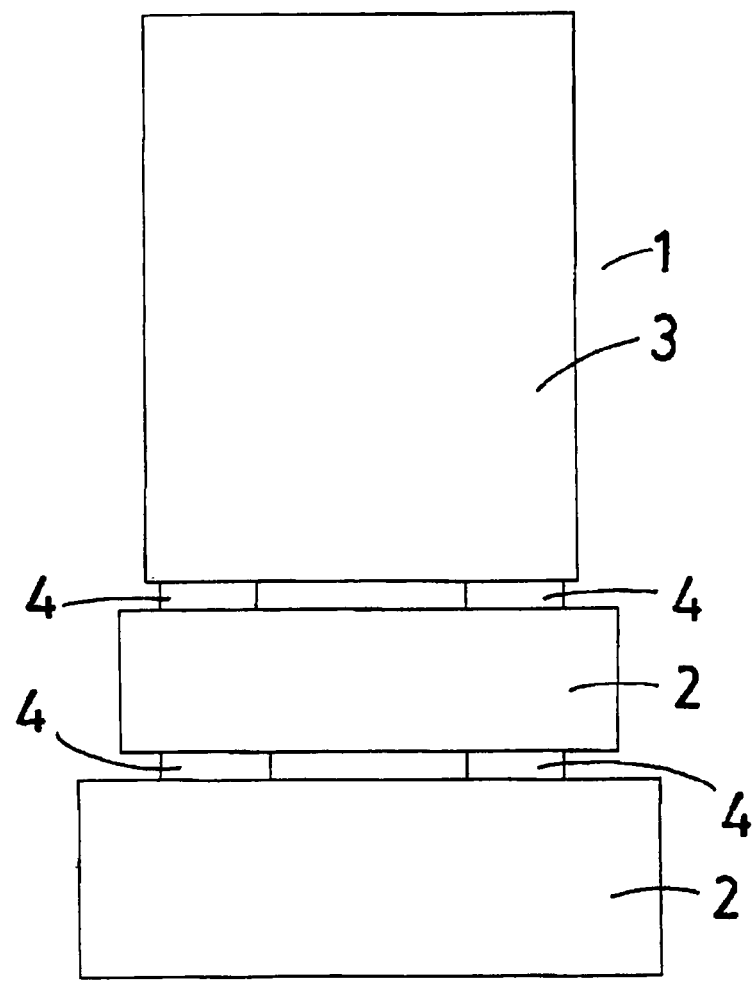
FIG. 1 is a top view sketch showing tip-resistant sheets placed on the base stone of the gravestone.
FIG. 2 is a front view sketch showing tip-resistant sheets placed on the base stone of a gravestone and then a vertically-standing stone placed thereon.
Figure 3:
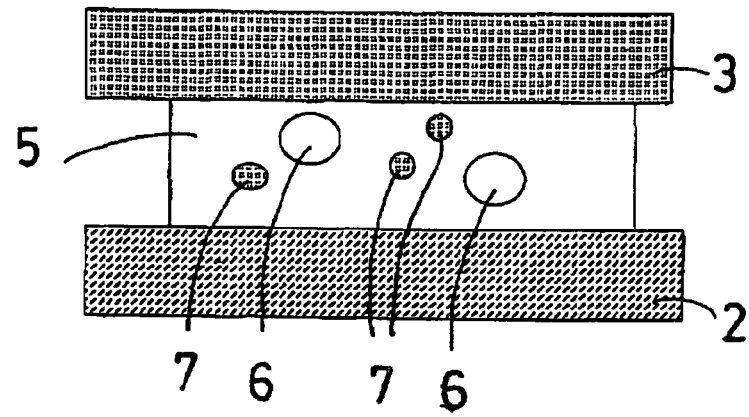
FIG. 3 is a cross-sectional sketch showing a tip-resistant sheet composed of a polyurethane elastic body, tin balls and alumina ceramic balls before being compressed by a heavy load.
Figure 4:
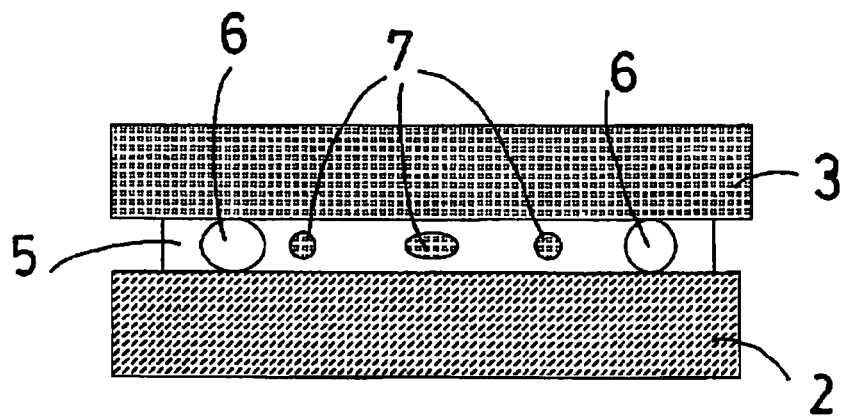
FIG. 4 is a cross-sectional sketch showing a tip-resistant sheet composed of a polyurethane elastic body, tin balls and alumina ceramic balls, when being compressed by a heavy load.
Figure 5:
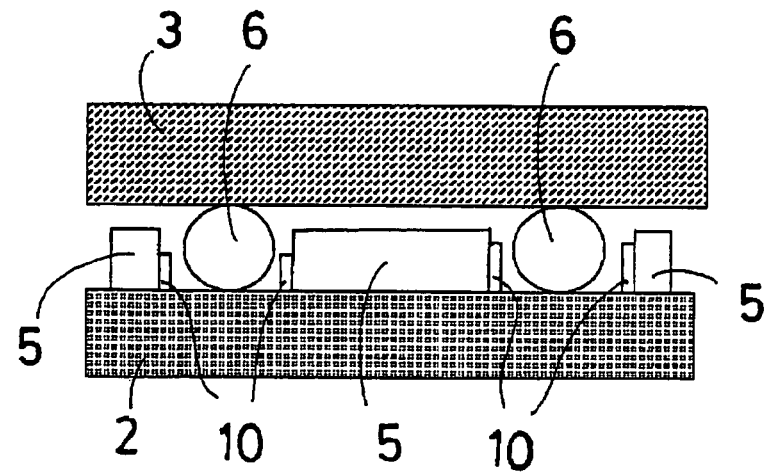
FIG. 5 is a cross-sectional sketch showing the state of the invention immediately after a polyurethane elastic body, as an elastic body sheet to be used for the tip-resistant method, together with tin balls, having a diameter greater than the thickness of the elastic body sheet, and cylindrical-shaped stopper walls, are embedded in the cylindrical-shaped air holes of the sheet, and said sheet is placed between a base stone and a vertically-standing stone of a gravestone.
Figure 6:
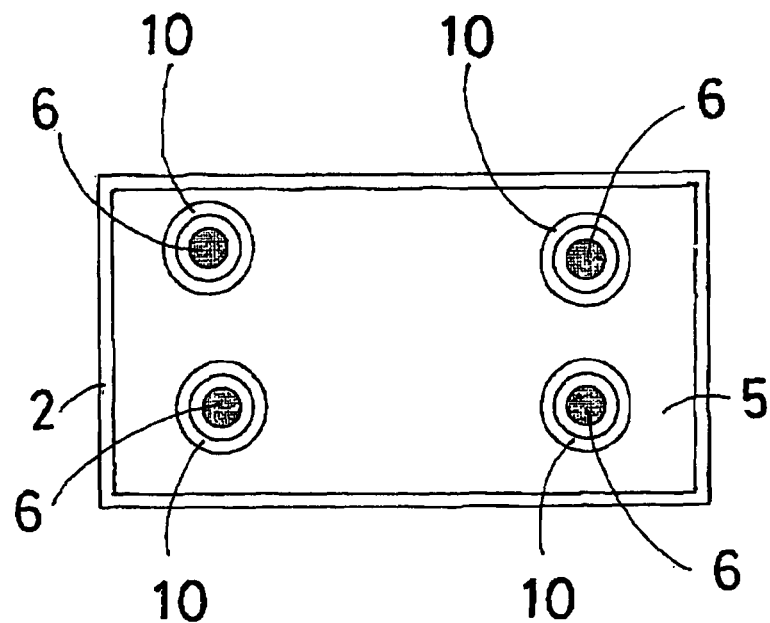
FIG. 6 is a top view of FIG. 5
Figure 7:
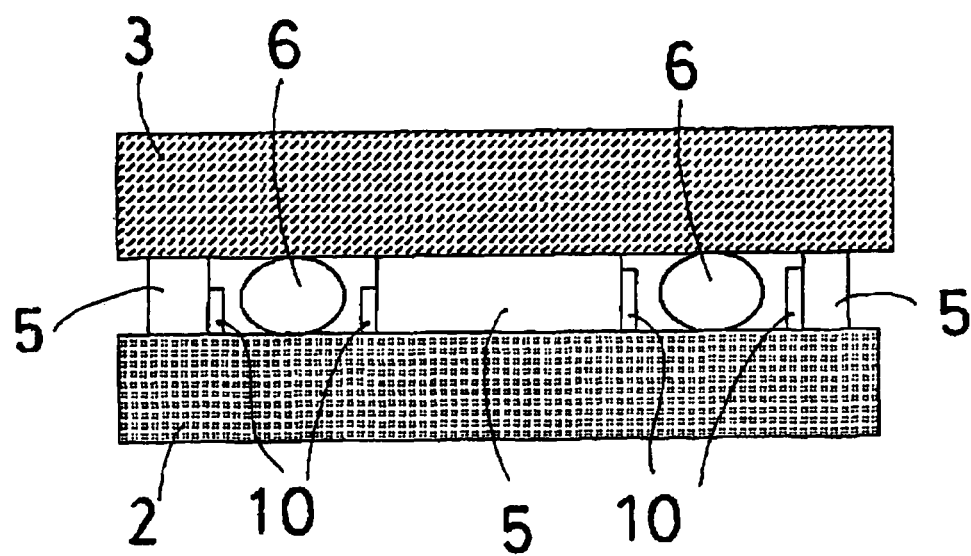
FIG. 7 is a cross-sectional sketch showing the state of the invention after being left for a certain period of time after a polyurethane elastic body, together with tin balls, having a diameter greater than the thickness of the elastic body sheet is placed between a base stone and a vertically-standing stone of a gravestone.
Figure 8:
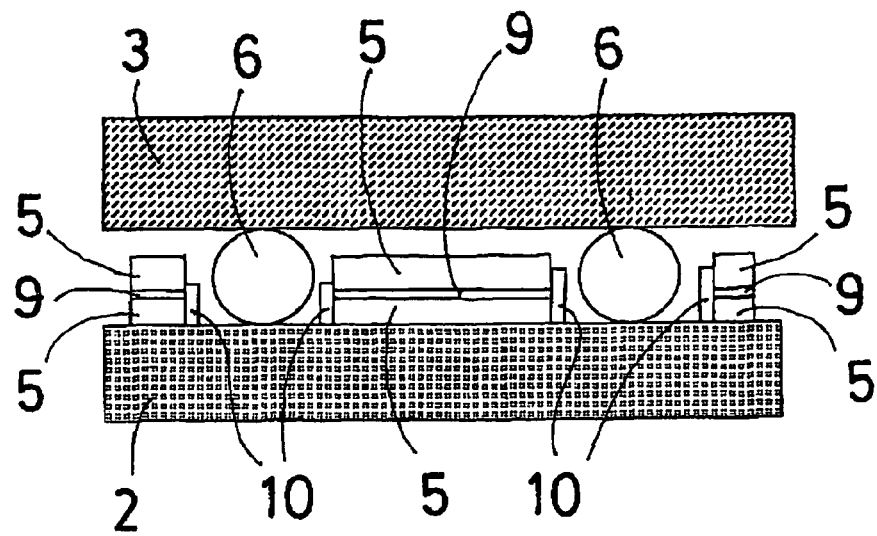
FIG. 8 is a cross-sectional sketch showing the state immediately after that an elastic body sheet composed of composite material, which is laminated with polyurethane elastic body sheet and metallic plate, and tin balls having a diameter greater than the thickness of the composite material are placed between a base stone and a vertically-standing stone of a gravestone.
Figure 9:
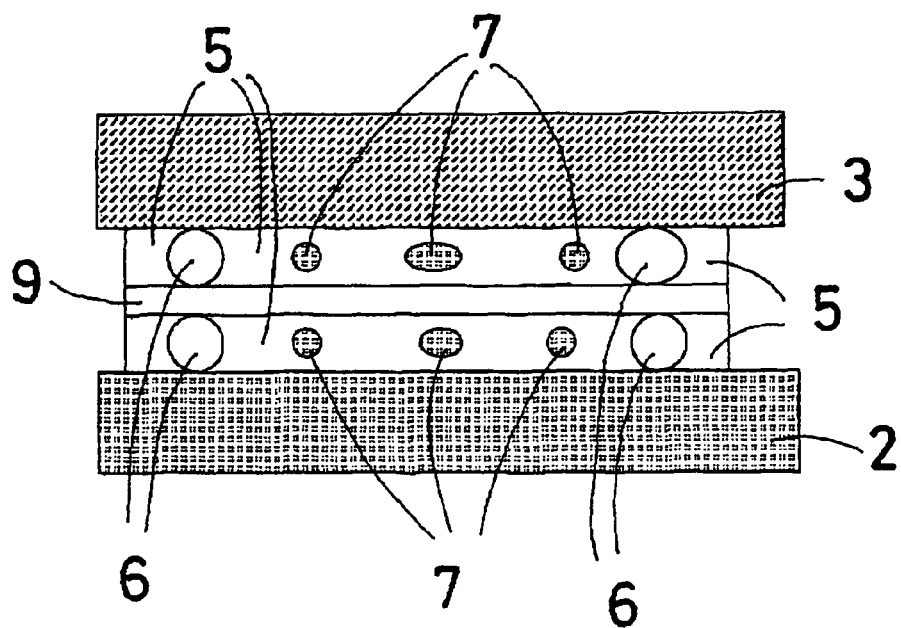
FIG. 9 is a cross-sectional sketch showing the state of the metallic plate that is placed on a sheet comprising polyurethane elastic bodies, tin balls and alumina ceramic balls, and another sheet comprising the same materials placed thereon, with the weight load then being applied on such a structured sheet.

What is claimed is:

1. A combination of a gravestone and a tip-resistant sheet, for preventing the gravestone from falling down due to an earthquake, wherein the tip resistant sheet includes an elastic material and one or more kinds of spherical bodies embedded in the elastic material, the spherical bodies being formed of materials that are harder to distort than the elastic material but that can be distorted by a load from the gravestone when the vibrating energy of an earthquake is applied to the spherical bodies, wherein the tip resistant sheet has a thickness ranging between 1.0 to 50 mm and wherein each spherical body is formed of a material selected from the group consisting of a metal, a linear polymer, a plastic with a cross linked structure, and a rubber having a higher vulcanization than the elastic material, and wherein the metal includes tins, lead-free solders, solders, leads, or brasses, the linear polymer includes polyethylene, polypropylene or polyester, and the plastic is melamine resin or epoxy resin.

2. The combination of claim 1, wherein each spherical body has a diameter that is equal to or smaller than the thickness of the sheet.

3. The combination of claim 1, further comprising stopper walls around the spherical bodies.

4. The combination of claim 1, further comprising metal or plastic layers fastened to the elastic material by laminating.

5. The combination of claim 1, wherein the elastic material is selected from the group consisting of polyurethane rubber, butyl rubber, acrylic rubber, silicon rubber, styrene-butadiene rubber, and natural rubber.

6. A combination of a stone monument and a tip-resistant sheet for preventing the stone monument from falling down due to an earthquake, wherein the tip resistant sheet includes an elastic material, and one or more kinds of spherical bodies embedded in the elastic material, the spherical bodies formed of materials that are harder to distort than the elastic material but that can be distorted by a load from the stone monument when the vibrating energy of an earthquake is applied to the spherical bodies, wherein the tip resistant sheet has a thickness ranging between 1.0 to 50 mm and wherein each spherical body is formed of a material selected from the group consisting of a metal, a linear polymer, a plastic with a cross linked structure, and a rubber having a higher vulcanization than the elastic material, and wherein the metal includes tins, lead-free solders, solders, leads, or brasses, the linear polymer includes polyethylene, polypropylene or polyester, and the plastic is melamine resin or epoxy resin.

7. The combination of claim 6, wherein each spherical body has a diameter that is equal to or smaller than the thickness of the sheet.

8. The combination of claim 6, further comprising stopper walls around the spherical bodies.

9. The combination of claim 6, further comprising metal or plastic layers fastened to the elastic material by laminating.

10. The combination of claim 6, wherein the elastic material is selected from the group consisting of polyurethane rubber, butyl rubber, acrylic rubber, silicon rubber, styrene-butadiene rubber, and natural rubber.

* * * * *